United States Patent
Burrows

(10) Patent No.: US 12,247,438 B2
(45) Date of Patent: Mar. 11, 2025

(54) DOUBLE-PANE INSULATING GLAZING UNITS

(71) Applicant: Cardinal CG Company, Eden Prairie, MN (US)

(72) Inventor: Keith James Burrows, Mineral Point, WI (US)

(73) Assignee: Cardinal CG Company, Eden Prairie, MN (US)

( * ) Notice: Subject to any disclaimer, the term of this patent is extended or adjusted under 35 U.S.C. 154(b) by 236 days.

(21) Appl. No.: 17/389,603

(22) Filed: Jul. 30, 2021

(65) Prior Publication Data

US 2022/0042370 A1  Feb. 10, 2022

Related U.S. Application Data

(60) Provisional application No. 63/062,965, filed on Aug. 7, 2020.

(51) Int. Cl.
| | |
|---|---|
| *E06B 3/67* | (2006.01) |
| *B32B 17/08* | (2006.01) |
| *E06B 3/66* | (2006.01) |
| *E06B 9/24* | (2006.01) |
| *E06B 3/663* | (2006.01) |

(52) U.S. Cl.
CPC ............ *E06B 3/6715* (2013.01); *B32B 17/08* (2013.01); *E06B 3/66* (2013.01); *E06B 3/67* (2013.01); *E06B 9/24* (2013.01); *B32B 2255/20* (2013.01); *B32B 2419/00* (2013.01); *E06B 2003/6638* (2013.01); *E06B 2009/2417* (2013.01)

(58) Field of Classification Search
CPC . E06B 3/66; E06B 3/67; E06B 3/6715; B32B 17/08; B32B 17/10055; B32B 2266/126; Y02A 30/249; Y02B 80/22
See application file for complete search history.

(56) References Cited

U.S. PATENT DOCUMENTS

| | | |
|---|---|---|
| 4,402,927 A | 9/1983 | Von Dardel et al. |
| 4,610,863 A | 9/1986 | Tewari et al. |
| 4,765,818 A | 8/1988 | Che et al. |
| 4,928,448 A | 5/1990 | Phillip |
| 5,027,574 A | 7/1991 | Phillip |
| 5,092,101 A | 3/1992 | Kunert |

(Continued)

FOREIGN PATENT DOCUMENTS

| | | |
|---|---|---|
| CA | 2036634 A1 | 9/1991 |
| CN | 101481985 A | 7/2009 |

(Continued)

OTHER PUBLICATIONS

Insight on Color, "Hunter L, a, b Color Scale," Applications Note, vol. 8, No. 9, 06/08, 2008, 4 pages.

(Continued)

*Primary Examiner* — Jessie T Fonseca
(74) *Attorney, Agent, or Firm* — Fredrikson & Byron, P.A.

(57) ABSTRACT

The invention provides a double-pane insulating glazing unit having a single between-pane space. The single between-pane space is located between the two glass panes. Preferably, the double-pane insulating glazing unit is devoid of a third glass pane. The double-pane insulating glazing unit has an aerogel layer located in the between-pane space.

20 Claims, 4 Drawing Sheets

(56) References Cited

U.S. PATENT DOCUMENTS

| | | | |
|---|---|---|---|
| 5,118,543 A | 6/1992 | Mccoll | |
| 5,154,953 A | 10/1992 | De Moncuit et al. | |
| 5,156,895 A | 10/1992 | Martin | |
| 5,242,647 A | 9/1993 | Poco | |
| 5,294,480 A | 3/1994 | Mielke et al. | |
| 5,524,381 A | 6/1996 | Chahroudi | |
| 5,525,430 A | 6/1996 | Chahroudi | |
| 7,117,914 B2 | 10/2006 | Chick | |
| 7,143,800 B2 | 12/2006 | Chick | |
| 7,339,728 B2 | 3/2008 | Hartig | |
| 7,342,716 B2 | 3/2008 | Hartig | |
| 7,572,509 B2 | 8/2009 | Hartig | |
| 7,572,510 B2 | 8/2009 | Hartig | |
| 7,572,511 B2 | 8/2009 | Hartig | |
| 7,780,890 B2 | 8/2010 | Lee et al. | |
| 7,832,177 B2 | 11/2010 | Stark | |
| 7,906,203 B2 | 3/2011 | Hartig | |
| 7,919,158 B2 | 4/2011 | Seth et al. | |
| 8,110,258 B2 | 2/2012 | Milburn | |
| 8,381,490 B2 | 2/2013 | Back et al. | |
| 8,557,356 B2 | 10/2013 | Colson | |
| 8,595,994 B1 * | 12/2013 | Grommesh | E06B 3/66304 52/204.593 |
| 8,652,282 B2 | 2/2014 | Milburn | |
| 8,844,218 B2 | 9/2014 | Showers | |
| 8,968,865 B2 | 3/2015 | Worsley et al. | |
| 9,034,934 B1 | 5/2015 | Attia | |
| 9,045,609 B2 | 6/2015 | Pasquero et al. | |
| 9,249,272 B2 | 2/2016 | Pasquero et al. | |
| 9,862,640 B2 | 1/2018 | Pfaff et al. | |
| 10,000,411 B2 | 6/2018 | Burrows et al. | |
| 10,000,965 B2 | 6/2018 | Burrows et al. | |
| 10,421,253 B2 | 9/2019 | Van Overmeere et al. | |
| 10,500,557 B2 | 12/2019 | Sakaguchi et al. | |
| 2005/0074566 A1 | 4/2005 | Rouanet et al. | |
| 2007/0082124 A1 | 4/2007 | Hartig | |
| 2008/0302059 A1 | 12/2008 | Du Plessis et al. | |
| 2009/0029147 A1 | 1/2009 | Tang et al. | |
| 2010/0146880 A1 | 6/2010 | Valentz et al. | |
| 2011/0206874 A1 | 8/2011 | Showers | |
| 2012/0081794 A1 | 4/2012 | Showers | |
| 2014/0065329 A1 | 3/2014 | Showers | |
| 2014/0116516 A1 | 5/2014 | Jones | |
| 2014/0141199 A1 | 5/2014 | Leonard | |
| 2015/0077957 A1 | 3/2015 | Sakatani et al. | |
| 2016/0097502 A1 | 4/2016 | Padiyath et al. | |
| 2016/0138324 A1 | 5/2016 | Lameris et al. | |
| 2016/0319588 A1 | 11/2016 | Samanta et al. | |
| 2017/0028686 A1 * | 2/2017 | Wilson | B32B 7/05 |
| 2018/0066469 A1 | 3/2018 | Vogel-Martin et al. | |
| 2018/0093456 A1 * | 4/2018 | Van Overmeere | B32B 3/26 |
| 2018/0134194 A1 | 5/2018 | Kawamura et al. | |
| 2018/0166353 A1 | 6/2018 | Garner et al. | |
| 2018/0237608 A1 | 8/2018 | Hess et al. | |
| 2018/0250913 A1 * | 9/2018 | Kotake | B32B 5/30 |
| 2018/0264784 A1 * | 9/2018 | Murofushi | B32B 17/10633 |
| 2018/0320824 A1 | 11/2018 | Fay et al. | |
| 2019/0154188 A1 | 5/2019 | Fujii et al. | |
| 2019/0333490 A1 | 10/2019 | Wang et al. | |
| 2020/0148587 A1 | 5/2020 | Burrows et al. | |
| 2020/0340612 A1 | 10/2020 | Kawamura et al. | |
| 2021/0094255 A1 | 4/2021 | Benkoski et al. | |
| 2021/0207428 A1 | 7/2021 | Pilon et al. | |
| 2021/0363812 A1 | 11/2021 | Hajjaj et al. | |
| 2022/0042369 A1 | 2/2022 | Burrows | |
| 2022/0332633 A1 | 10/2022 | Burrows et al. | |
| 2022/0369480 A1 | 11/2022 | Sage et al. | |
| 2023/0050347 A1 | 2/2023 | Kitzman et al. | |

FOREIGN PATENT DOCUMENTS

| | | |
|---|---|---|
| CN | 206581820 U | 10/2017 |
| CN | 108060874 A | 5/2018 |
| CN | 108623194 A | 10/2018 |
| CN | 108625741 A | 10/2018 |
| CN | 109502997 A | 3/2019 |
| CN | 109592908 A | 4/2019 |
| CN | 109989680 A | 7/2019 |
| CN | 112431520 A | 3/2021 |
| KR | 101583005 B1 | 12/2015 |
| WO | 2006065904 A1 | 6/2006 |
| WO | 2006121954 A2 | 11/2006 |
| WO | 2018170772 A1 | 9/2018 |
| WO | 2019241603 A1 | 12/2019 |
| WO | 2020005965 A1 | 1/2020 |
| WO | 2020084668 A1 | 4/2020 |
| WO | 2021129488 A1 | 7/2021 |
| WO | 2021224228 A1 | 11/2021 |
| WO | 2022031536 A1 | 2/2022 |

OTHER PUBLICATIONS

Buettner, "Investigation of Bacterial Cellulose as a Carbon Fiber Precurser and its Potential for Piezoelectric Energy Harvesting," Thesis, Cornell University, Aug. 2014, 90 pages.

Leitch et al., "Bacterial Nanocellulose Aerogel Membranes: Novel High-Porosity Materials for Membrane Distillation," Environmental Science and Technology Letters, vol. 3, 2016, pp. 8591.

Jia et al., "Preparation and characterization of a novel bacterial cellulose/chitosan bio-hydrogel," Nanomaterials and Nanotechnology, vol. 7, 2017, pp. 18.

Merli, F et al., "Acoustic measurements on monolithic aerogel samples and application of the selected solutions to standard window systems," Applied Acoustics, 142 (2018), 123-131, 9 pages.

Bhuiya, M.M.H. et al., "Preparation of Monolithic Silica Aerogel for Fenestration Applications: Scaling up, Reducing Cycle Time and Improving Performance," Ind. Chem. Res. (2016), 55, 6971-6981, 11 pages.

Jensen, K.I. et al., "Development of windows based on highly insulating aerogel glazings," Journal of Non-Crystalline Solids, 350 (2004) 351-357, 7 pages.

PCT International Search Report and Written Opinion dated Oct. 20, 2021 for related International Application No. PCT/US2021/043838, 11 pages.

Full English Translation of Chinese Publication No. 109989680 A, published Jul. 9, 2019, 36 pages.

Strobach, E., "Optically Transparent, Thermally Insulating and Soundproofing (OTTIS) Aerogel for High-Efficiency Window Applications," Massachusetts Institute of Technology, Jan. 15, 2020, 119 pages.

Paakko et al., "Long and entangled native cellulose I nanofibers allow flexible aerogels and hierarchically porous templates for functionalities", Soft Matter, 2008, 4, Published Sep. 23, 2008, pp. 2492-2499.

Wilson, "Fascinating world of gas-fill windows", Brattleboro Reformer, Downloaded from www.reformer.com/local-news/fascinating-world-of-gas-fill-windows/article_55f4a3be-da2f-5ba8-8da8-d5b44209f040.html, Published Apr. 3, 2012, pp. 3.

* cited by examiner

DOUBLE-PANE INSULATING GLAZING UNITS

RELATED APPLICATIONS

This application claims priority to U.S. Provisional Patent Application No. 63/062,965, filed Aug. 7, 2020, the contents of which are herein incorporated by reference.

FIELD OF THE INVENTION

The present invention relates to multiple-pane insulating glazing units. More particularly, the present invention relates to double-pane insulating glazing units.

BACKGROUND OF THE INVENTION

Various types of multiple-pane insulating glazing units (or "IG units") are known. Some have two panes, while others have three panes. The thermal insulation properties of gas-filled triple-pane IG units tend to be greater than those of gas-filled double-pane IG units. Triple-pane IG units, however, have an overall unit width greater than that of conventional double-pane IG units. Triple-pane units also tend to be much heavier than double-pane units.

It would be desirable to provide double-pane IG units that have an advantageous, relatively narrow width. It would also be desirable to provide double-pane IG units that provide exceptional thermal insulation, ideally through favorable suppression of heat transfer by radiation, convection, and conduction.

Aerogel is a known insulation material. In some cases, aerogel has been provided in granular, particulate form.

It would be desirable to provide IG unit constructions that incorporate aerogel therein so as to achieve excellent thermal insulation properties. It would be particularly desirable to incorporate the aerogel into a double-pane IG unit in a manner that enhances the collective thermal insulation properties of the aerogel, one or more thin-film coatings, and the single between-pane space.

SUMMARY OF THE INVENTION

Figure 1:
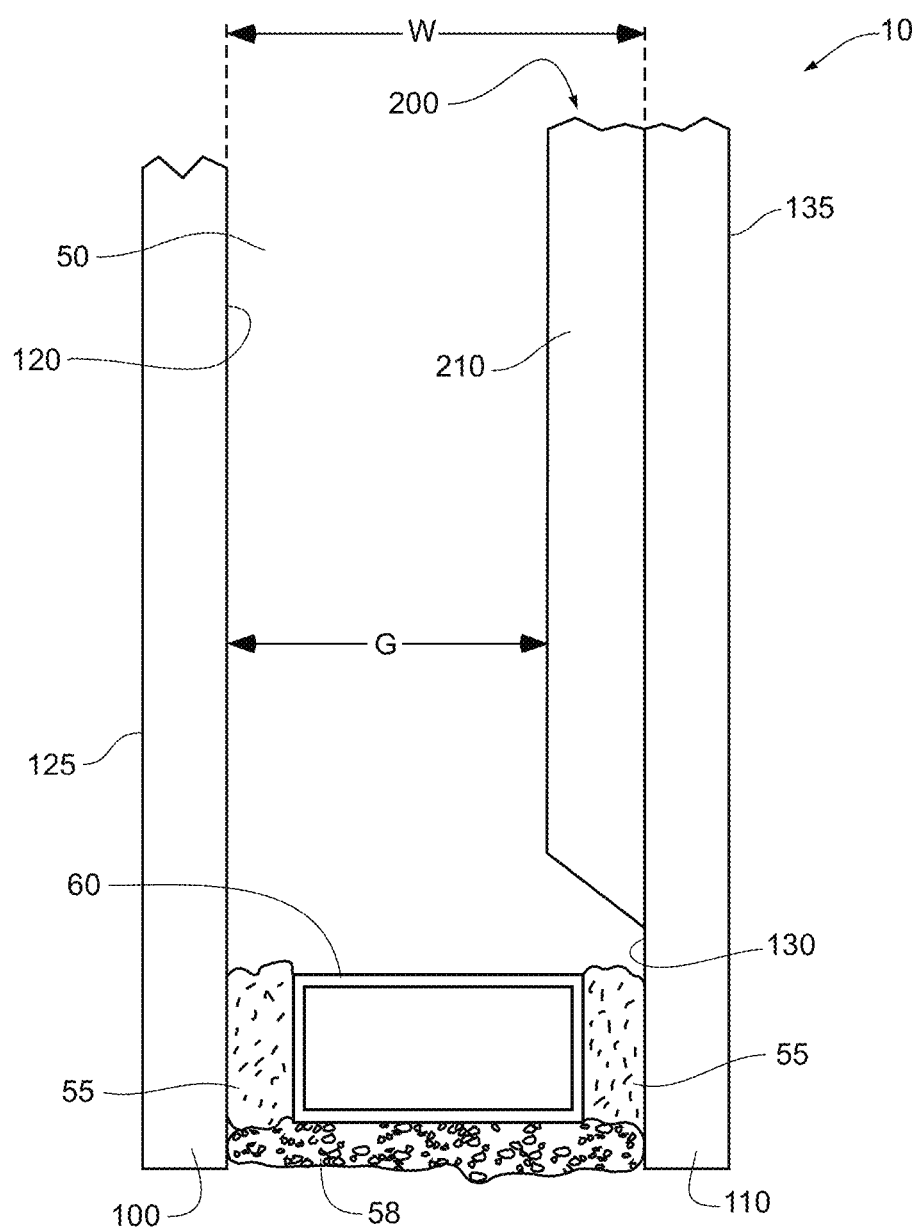
FIG. 1 is a schematic, broken-away, cross-sectional side view of a double-pane insulating glazing unit in accordance with certain embodiments of the present invention.

Certain embodiments of the invention provide a double-pane insulating glazing unit, which has a single between-pane space and two glass panes. The single between-pane space is located between the two glass panes, and the double-pane insulating glazing unit is devoid of a third glass pane. In the present embodiments, the double-pane insulating glazing unit has an aerogel layer and a low-emissivity coating. The low-emissivity coating is on an interior surface of a first one of the two glass panes. The aerogel layer is on an interior surface of a second one of the two glass panes. Thus, the low-emissivity coating and the aerogel layer are both located inside the between-pane space. The low-emissivity coating and the aerogel layer are separated from each other by a gas gap, which contains a gaseous atmosphere. In the present embodiments, the double-pane insulating glazing unit preferably has a U factor in a range of from 0.11 to 0.21 Btu/(h·f$^2$·°F.), a visible transmission in a range of 0.64 to 0.76, and a haze of from 0.5% to 4%. Perhaps more preferably, the U factor is less than 0.2 Btu/(h·f$^2$·°F.) but greater than 0.14 Btu/(h·f$^2$·°F.), and the visible transmission is greater than 0.65 but less than 0.76. The aerogel layer preferably does not comprise flowable particulate aerogel particles, but rather is formed by one or more aerogel sheets adhered to the interior surface of the second one of the two glass panes. In some cases, the aerogel layer has a thickness of greater than 2 mm but less than 8 mm.

In some embodiments, the invention provides a double-pane insulating glazing unit, which has a single between-pane space and two glass panes. The single between-pane space is located between the two glass panes, and the double-pane insulating glazing unit is devoid of a third glass pane. In the present embodiments, the single between-pane space has a width of 13 mm or greater, such as from 13 to 21 mm. The double-pane insulating glazing unit has an aerogel layer that is carried alongside one of the two glass panes and that is located inside the between-pane space. A gas gap is located inside the between-pane space alongside the aerogel layer. In the present embodiments, the gas gap has a width in a range of from 9 to 14 mm and it contains a gaseous atmosphere comprising argon, air, or both. Perhaps more preferably, the single between-pane space has a width in a range of from 14 to 21 mm, the gaseous atmosphere comprises argon, and the width of the gas gap is from 10.5 to 13.5 mm. The aerogel layer preferably does not comprise flowable particulate aerogel particles, but rather is formed by one or more aerogel sheets adhered to the interior surface of the second one of the two glass panes. In some cases, the aerogel layer has a thickness of greater than 2 mm but less than 8 mm.

Certain embodiments of the invention provide a double-pane insulating glazing unit, which has a single between-pane space and two glass panes. The single between-pane space is located between the two glass panes, and the double-pane insulating glazing unit is devoid of a third glass pane. In the present embodiments, the double-pane insulating glazing unit has an aerogel layer, a low-emissivity coating, and a transparent conductive oxide coating. The low-emissivity coating is on an interior surface of a first one of the two glass panes, and the aerogel layer is on an interior surface of a second one of the two glass panes. Thus, the low-emissivity coating and the aerogel layer are both located inside the between-pane space. The transparent conductive oxide coating is on an exterior surface of the second one of the two glass panes. Thus, the second one of the two glass panes supports both the aerogel layer and the transparent conductive oxide coating. The low-emissivity coating and the aerogel layer are separated from each other by a gas gap, which contains a gaseous atmosphere. In the present embodiments, the double-pane insulating glazing unit has a U factor in a range of from 0.11 to 0.19 Btu/(h·f$^2$·°F.), a visible transmission in a range of 0.64 to 0.72, and a haze of from 0.5% to 4%. The aerogel layer preferably does not comprise flowable particulate aerogel particles, but rather is formed by one or more aerogel sheets adhered to the interior surface of the second one of the two glass panes. In some cases, the aerogel layer has a thickness of greater than 2 mm but less than 8 mm.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides a double-pane insulating glazing unit 10, which includes two glass panes 100, 110 and has only one between-pane space 50. The single between-pane space 50 is located between the two glass panes 100, 110. In most embodiments, the double-pane insulating glazing unit 10 is devoid of a third glass pane.

The double-pane insulating glazing unit 10 has an aerogel layer 200, which preferably is on an interior surface of one of the two glass panes 100, 110. The aerogel layer 200 comprises one or more aerogel sheets 210.

A gas gap G is located alongside the aerogel layer 200. The gas gap G contains a gaseous atmosphere, preferably comprising a thermally insulative gas, such as argon, krypton, or both. In some cases, the gaseous atmosphere comprises a mix of argon and air (e.g., 90% argon and 10% air). In other cases, the gaseous atmosphere comprises a mix of krypton and air. In still other cases, the gaseous atmosphere comprises a mix of argon, krypton, and air. In yet other cases, the gaseous atmosphere is just air.

In certain preferred embodiments, the single between-pane space 50 has a width W of 13 mm or greater (perhaps 14 mm or greater, such as 15 mm or greater), while the gas gap G has a width in a range of from 9 to 14 mm (perhaps from 10 to 14 mm, such as from 11 to 13 mm) and contains a gaseous atmosphere comprising argon, air, or both. In these embodiments, the double-pane insulating glazing unit 10 has additional thermal insulation from the inclusion of aerogel in the noted sheet/layer arrangement, together with the arrangement and width of the gas gap G providing a sweet spot for the thermal insulation performance of such gas fills. For embodiments where the gas fill is argon or a mixture of argon and air (e.g., about 90% argon and about 10% air), the width of the between-pane space 50 can optionally be in any one or more of the three between-pane space width ranges noted above, while the width of the gas gap G is in a range of from 10 to 14 mm (perhaps optimally from 11 to 13 mm). In any embodiments described in this paragraph, the double-pane insulating glazing unit 10 can optionally have a thickness of less than 30 mm, less than 25 mm, less than 23 mm, or in some cases even less than 22 mm.

Referring to the drawings, and starting with FIG. 1, there is shown one example of a double-pane insulating glazing unit of the present disclosure, generally represented by reference numeral 10. The double-pane insulating glazing unit 10 includes two glass panes: a first glass pane 100 and a second glass pane 110. A variety of well-known glass types can be used for the first 100 and second 110 glass panes, such as soda-lime glass or borosilicate glass. In some cases, it may be desirable to use "white glass," a low iron glass, etc.

In certain embodiments (e.g., where the unit 10 is mounted in a frame), the double-pane insulating glazing unit 10 is part of a window, door, skylight, or other glazing.

Glass panes of various sizes can be used in the present invention. Commonly, large-area glass sheets are used. Certain embodiments involve first and second glass panes 100, 110 each having a major dimension (e.g., a length or width) of at least about 0.5 meter, preferably at least about 1 meter, perhaps more preferably at least about 1.5 meters (e.g., between about 2 meters and about 4 meters), and in some cases at least about 3 meters.

Glass panes of various thicknesses can be used in the present invention. In some embodiments, each glass pane has a thickness of about 1-8 mm. Certain embodiments involve glass sheets with a thickness of between about 2.3 mm and about 4.8 mm, and perhaps more preferably between about 2.5 mm and about 4.8 mm. In one particular embodiment, glass panes (e.g., soda-lime glass) with a thickness of about 3 mm are used.

In alternative embodiments, one or both glass panes 100, 110 are replaced with panes formed of a polymer, such as polycarbonate. Various other polymer materials may be used in such alternative embodiments.

As noted above, the double-pane insulating glazing unit 10 has only one between-pane space 50. In some cases, the first glass pane 100 is part of a laminated glass panel (which further comprises a third glass pane and a polymer interlayer). Additionally or alternatively, the second glass pane 110 can be part of a laminated glass panel (which further comprises another glass pane and a polymer interlayer). Thus, in some cases, the between-pane space is located between two laminated glass panels. In many embodiments, however, the double-pane insulating glazing unit 10 has only two glass panes. Moreover, the double-pane insulating glazing unit 10 does not include (i.e., is devoid of) a second between-pane space.

The first glass pane 100 has opposed surfaces 120, 125, which preferably are opposed major surfaces (or "opposed faces"). Similarly, the second glass pane 110 has opposed surfaces 130, 135, which preferably are opposed major surfaces. As shown in FIG. 1, surfaces 120 and 130 are confronting interior surfaces facing the between-pane space 50. In contrast, surfaces 125 and 135 are exterior surfaces facing away from the between-pane space 50. Preferably, surface 125 is configured to be an outboard surface exposed to an outdoor environment (and thus exposed to periodic contact with rain), while surface 135 is configured to be an inboard surface exposed to an indoor environment within a house or another building. Accordingly, the first glass pane 100 preferably is configured to be an outboard pane, while the second glass pane 110 preferably is configured to be an inboard pane.

In some cases, the double-pane insulating glazing unit 10 has a thickness of less than 30 mm, less than 25 mm, less than 23 mm, or even less than 22 mm. For any embodiment of the present disclosure, the unit 10 thickness can optionally be in any one or more of these ranges. The thickness of the unit 10 is defined as the distance between the opposing exterior pane surfaces (e.g., from surface 125 to surface 135).

The aerogel layer 200 is located between the first 100 and second 110 glass panes, i.e., in the between-pane space 50. Preferably, the aerogel layer 200 is on an interior surface 130 of the second glass pane 110. In other embodiments, the aerogel layer is on the interior surface 120 of the first glass pane 100. In both such arrangement types, there may be one or more coatings or layers between the glass and the aerogel layer. A coating or layer may be provided, for example, to adhere the aerogel to the glass. In some cases, a layer of optical adhesive is provided. In other cases, the aerogel layer 200 is in direct contact with the glass. Thus, the aerogel layer 200 preferably is carried alongside, and supported by, one of the glass panes (100 or 110). An alternative arrangement is to provide the aerogel layer on a suspended film mounted within the between-pane space, e.g., such that the film and the aerogel layer are spaced apart from both glass panes.

As used herein, the term "aerogel" refers to a material obtained by combining either a nonfluid colloidal network or a polymer network with a liquid so as to form a gel, and then removing the liquid from the gel and replacing the liquid with a gas or vacuum. As discussed below, the resulting aerogel (e.g., the preferred cellulose-based aerogel described herein) has very low density and provides excellent insulating properties.

The aerogel layer 200 can comprise a silica-based aerogel or a polymer-based aerogel. Due to the commonly more fragile nature of silica-based aerogels, however, the aerogel layer 200 more preferably comprises (e.g., is) a polymer-based aerogel.

In preferred embodiments, the aerogel is a cellulose-based aerogel. This can optionally be the case for any embodiment of the present disclosure. Cellulose-based aerogels are described in International PCT Patent Application No. PCT/US2019/037122, the teachings of which are incorporated herein by reference. Such aerogel can contain cellulosic nanocomposites that are aligned in ordered liquid crystal phases.

The aerogel layer 200 is provided in the form of one or more aerogel sheets 210. This is in contrast to aerogel in flowable granular or other particulate form. The aerogel sheet(s) 210 preferably are self-supporting, i.e., once fully synthesized and formed, the sheet(s) can retain their sheet form without being adhered to glass or another support. It is to be appreciated, however, that once incorporated into the double-pane insulating glazing unit 10, the aerogel layer 200 preferably is supported by one of the glass panes 100, 110. As illustrated, the unit 10 preferably does not include any cell or honeycomb structure surrounding/containing particulate aerogel.

The aerogel layer 200 has opposed major surfaces (or "faces"). Preferably, one face of the aerogel layer 200 is carried against (e.g., is in contact with) an interior surface 120, 130 of one of the panes 100, 110, while the other face of the aerogel layer is exposed to the between-pane space 50. In addition, the peripheral edge of the aerogel layer 200 preferably is exposed to the between-pane space. This can optionally be the case entirely about the perimeter of the aerogel layer 200.

In some cases, the aerogel layer 200 is a single aerogel sheet 210. In such cases, there is only one aerogel sheet 210 in the between-pane space 50. A single aerogel sheet 210 may thus define the entire peripheral edge of the aerogel layer 200. As noted above, the peripheral edge preferably is exposed to the between-pane space 50 (optionally entirely about the perimeter of the aerogel layer).

When a single aerogel sheet 210 is used, it preferably covers at least 75% of the area of the adjacent interior glass surface 120, 130. The single aerogel sheet 210 can, for example, have a major dimension (e.g., a length or width) of at least 0.375 meter, preferably at least about 0.75 meter, or in some cases at least about 1.125 meters (e.g., between about 1.5 meters and about 3 meters).

In other cases, the aerogel layer 200 comprises a plurality of aerogel sheets 210. In such cases, there are a plurality of aerogel sheets 210 in the between-pane space 50. A plurality of aerogel sheets 210 may thus collectively define the peripheral edge of the aerogel layer 200. As noted above, the peripheral edge preferably is exposed to the between-pane space 50 (optionally entirely about the perimeter of the aerogel layer).

When multiple aerogel sheets 210 are used, they can be arranged in a tiled configuration between the two glass panes 100, 110. When a tiled configuration is used, multiple aerogel sheets 210 preferably are arranged in a non-overlapping manner so as to cover a majority (i.e., greater than 50%, preferably at least 75%) of the area of the adjacent interior glass surface 120, 130.

Whether the aerogel layer 200 is formed by one or multiple aerogel sheets 210, it preferably covers more than 60% (e.g., more than 70%, more than 80%, or even more than 90%) of the adjacent interior glass surface 120, 130. An aerogel coverage within any one or more (e.g., all) of these ranges can optionally be used in any embodiment of the present disclosure.

When the aerogel layer 200 comprises a plurality of aerogel sheets 210, those sheets can have any desired shape and tiling arrangement. As non-limiting examples, the aerogel sheets 210 can be square, rectangular, or hexagonal in shape. In some embodiments, edges of each aerogel sheet are aligned both vertically and horizontally with edges of adjacent aerogel sheets. Reference is made to U.S. Patent Application No. 63/062,910, the teachings of which relating to aerogel sheet tiling arrangements are hereby incorporated by reference.

When multiple aerogel sheets 210 are provided in a tiling arrangement, the size of the aerogel sheets is not particularly limited. In some cases, all of the aerogel sheets have the same dimensions. In other cases, some of the aerogel sheets have different dimensions (e.g., a greater length) compared to some of the other aerogel sheets. Preferably, each of the aerogel sheets has a length and a width of at least 10 cm. For each of the aerogel sheets, the length, the width, or both are preferably less than 1 meter. Such dimensions allow the aerogel sheets to be scaled-up so as to cover large areas between two glass panes of a double-pane insulating glazing unit, while still allowing the aerogel sheets to be dried using a small high-pressure vessel. Larger or smaller aerogel sheets may alternatively be used.

Preferably, the aerogel layer 200 is adhered to an interior surface 120, 130 of one of the glass sheets 100, 110. By saying the aerogel layer is "adhered to" a glass surface, this does not require any separate adhesive. It also does not require the aerogel to contact the glass; there may be a coating or layer therebetween. Thus, although "adhered to" may involve direct contact, the broader meaning as used herein is "carried alongside." That means the aerogel layer 200 is supported by the glass surface, and in some embodiments the aerogel does contact the glass surface. In some embodiments, there is at most one layer (e.g., an optical adhesive layer) between the aerogel layer 200 and the glass.

Figure 4:
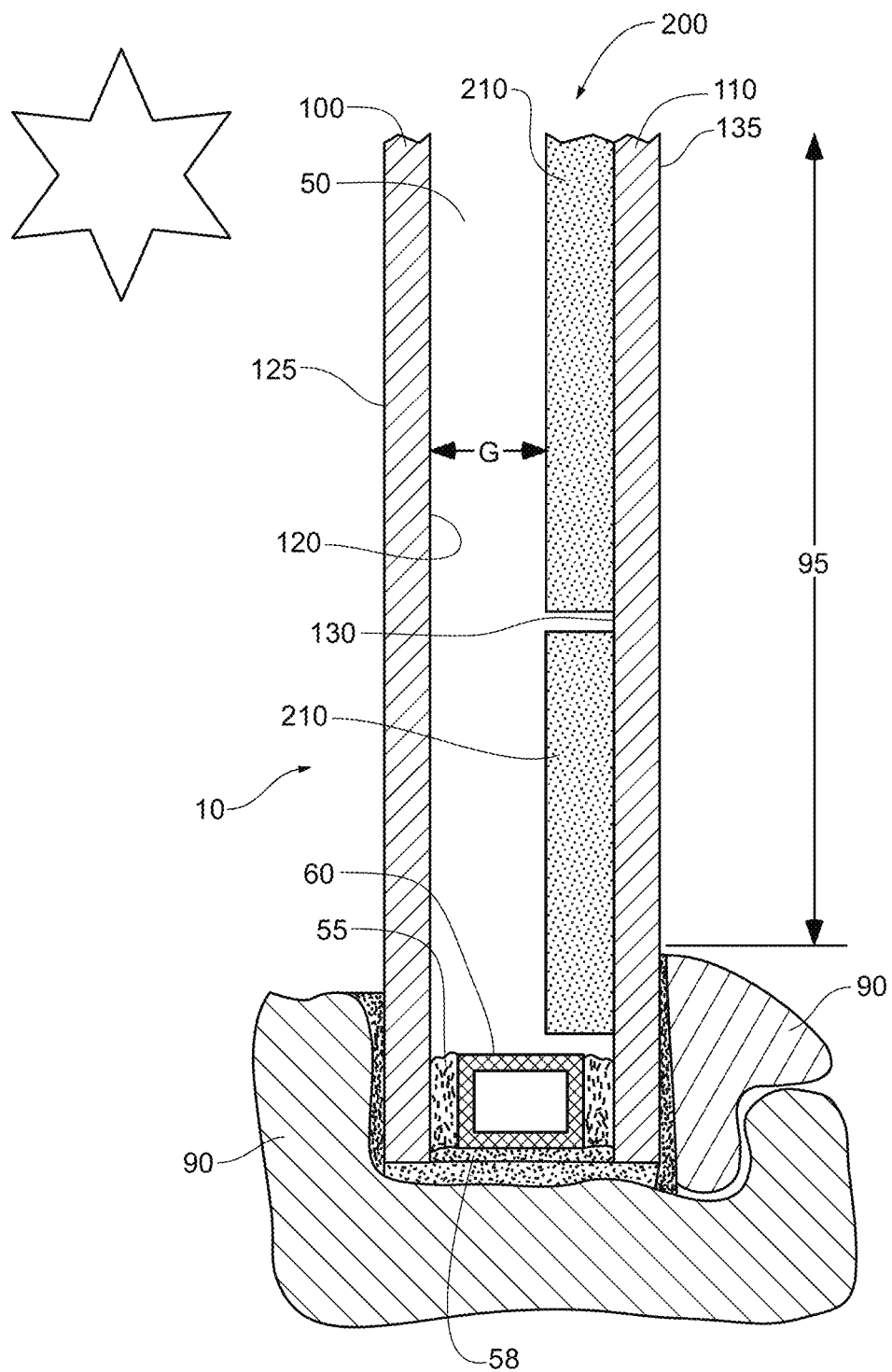
FIG. 4 is a schematic, broken-away, cross-sectional side view of a double-pane insulating glass unit mounted in a frame according to some embodiments of the invention.

The double-pane insulating glazing unit 10 has a vision area 95. As used herein, the term "vision area" refers to the area of the double-pane insulating glazing unit 10 through which a person is able to see once the unit is mounted operably in a frame 90. In FIG. 4, for example, the vision area 95 of the unit 10 is shown. In embodiments where the unit 10 is mounted in a frame 90, the frame may delineate the vision area 95 (e.g., such that the vision area is the area inward from an interior edge of the frame). The perimeter edge of the aerogel layer 200 preferably is located outside of the vision area 95 (e.g., so as to be positioned at locations that will be concealed from view by the frame 90). This can optionally be the case for any embodiment of the present disclosure.

The aerogel layer 200 preferably is arranged so as to cover a majority (i.e., greater than 50%) of the vision area 95. In some embodiments, the aerogel layer 200 covers at least 60%, at least 70%, or at least 80% of the vision area 95 of the double-pane insulating glazing unit 10. In certain embodiments, the aerogel layer 200 covers an entirety of the vision area 95.

With reference to the frame 90 shown in FIG. 4, or otherwise referenced in the present disclosure, it is to be appreciated that this frame may be a sash or part of a sash (e.g., an exterior weather strip and/or glazing bead). The vision area is determined when looking straight at the adjacent pane surface from a vantage point aligned with an outermost perimeter of the vision area. Moreover, to the extent an outboard portion of the frame projects further inwardly than does an inboard portion of the frame (or vice versa), the vision area is to be considered that area that is inward of the frame portion that projects furthest inwardly. This can be appreciated by referring to FIG. 4. In some cases, that frame portion may be an exterior sash portion comprising vinyl or another polymer.

As noted above, in certain embodiments, the between-pane space 50 is filled with a thermally insulative gas mix, such as a mix of 90% argon and 10% air. This, however, is not required. For example, the IG unit 40 may alternatively be filled with air or a desired single gas.

In some embodiments, the first glass sheet 100 is an outboard pane that defines both a #1 surface (i.e., surface 125) and a #2 surface (i.e., surface 120), and the second glass sheet 110 is an inboard pane that defines both a #3 surface (i.e., surface 130) and a #4 surface (i.e., surface 135). The double-pane insulating glass unit 10 can optionally be mounted in a frame 90. Reference is made to FIG. 4. Here, the #1 surface is exposed to an outdoor environment, while the #4 surface is exposed to an indoor environment. The frame 90 can be any type of window frame or other glazing frame; the frame can be a sash.

The aerogel layer 200 can be adhered to either the #2 surface or the #3 surface of the double-pane insulating glazing unit 10. Another option is to have aerogel layers on both the #2 and the #3 surfaces.

Figure 2:
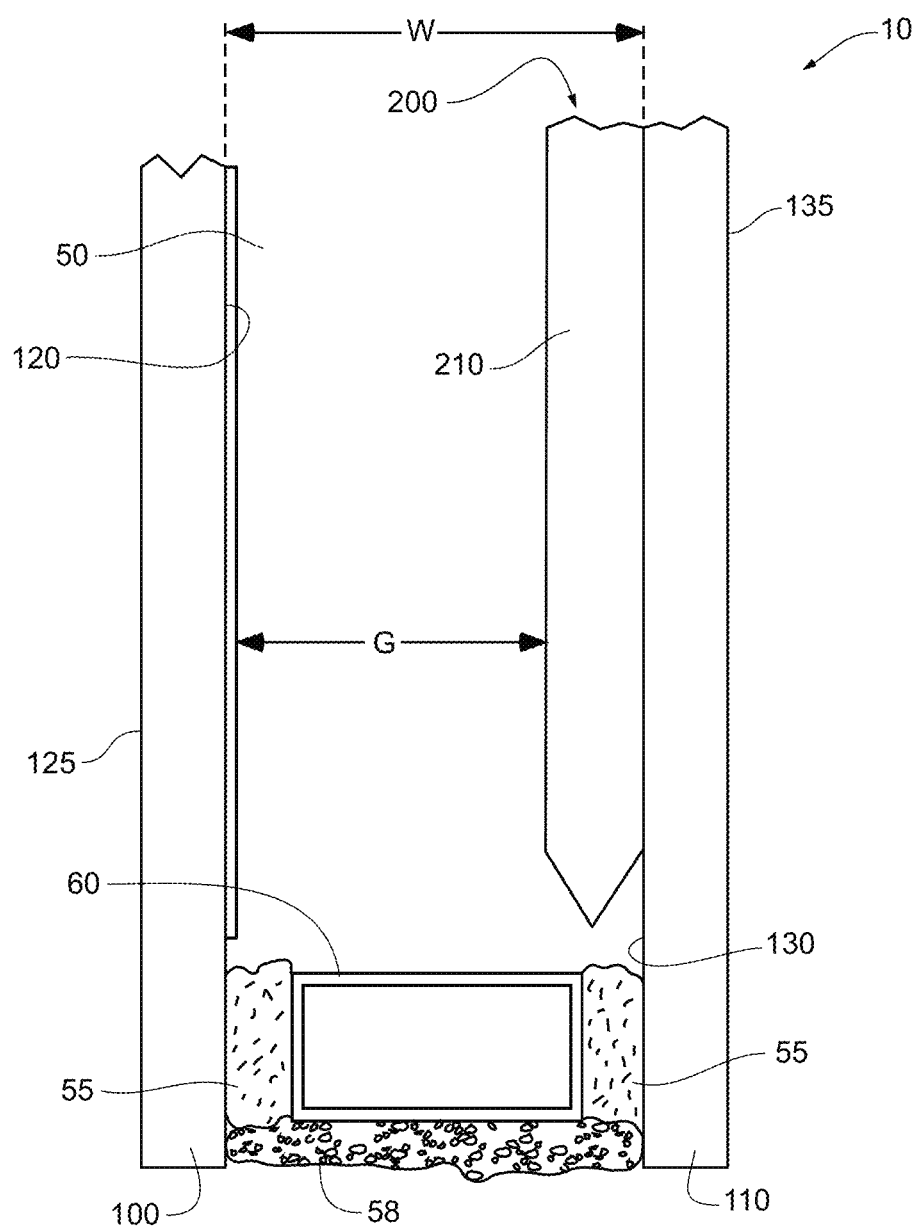
FIG. 2 is a schematic, broken-away, cross-sectional side view of a double-pane insulating glazing unit in accordance with other embodiments of the invention.
Figure 3:
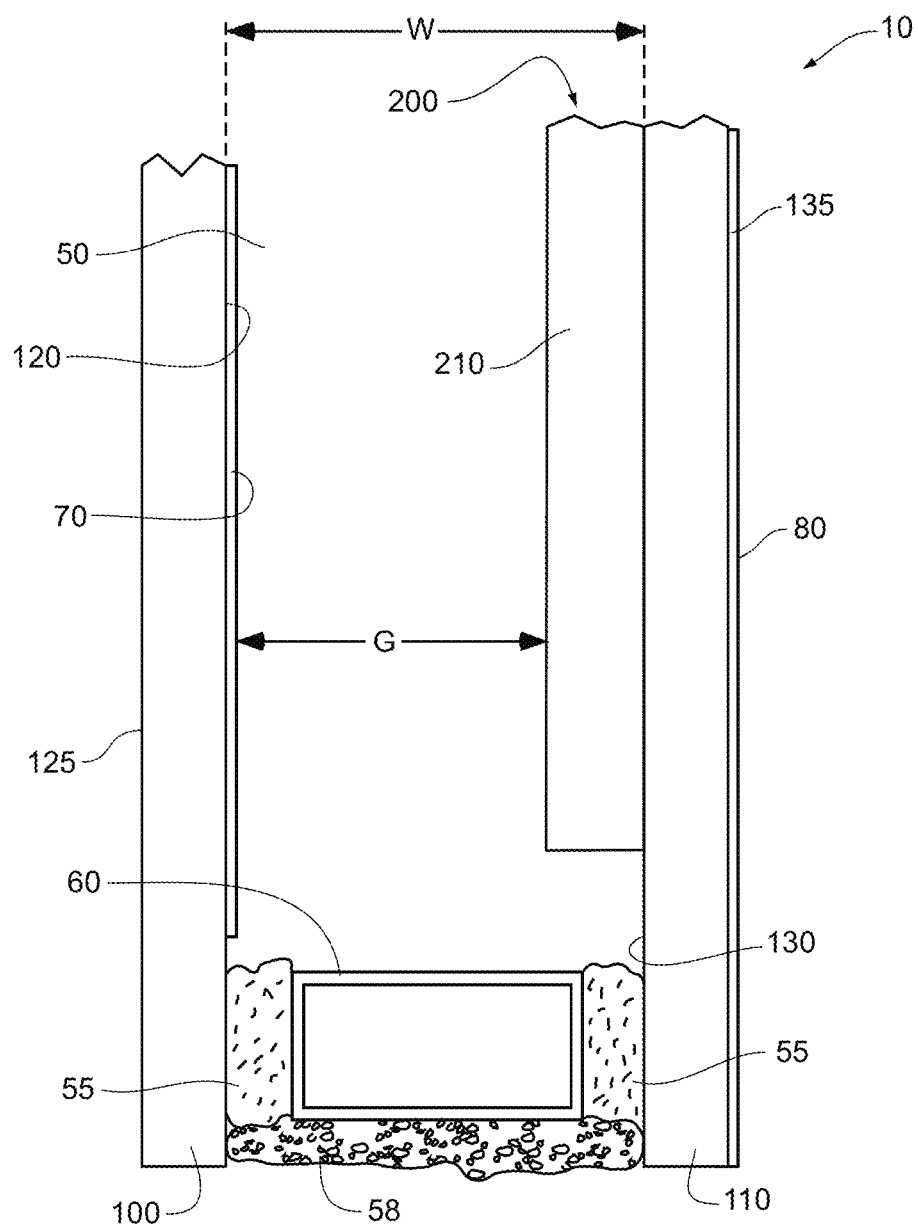
FIG. 3 is a schematic, broken-away, cross-sectional side view of a double-pane insulating glazing unit in accordance with still other embodiments of the invention.

Preferably, the double-pane insulating glazing unit 10 also includes a low-emissivity coating 70. Reference is made to FIGS. 2 and 3, where the #2 surface bears the low-emissivity coating 70. In embodiments of this nature, the aerogel layer 200 can be adhered to the #3 surface (i.e., surface 130) and can be spaced from the low-emissivity coating 70. Alternatively, the aerogel layer can be on the #2 surface, while a low-emissivity or solar control coating is on the #3 surface. In certain embodiments, the aerogel layer 200 is spaced from the low-emissivity coating 70 by at least 2 mm but not more than 15 mm (e.g., by 4-15 mm, or 10-15 mm).

When provided, the low-emissivity coating 70 preferably includes at least one silver-inclusive film, which desirably contains more than 50% silver by weight (e.g., a metallic silver film). In certain preferred embodiments, the low-emissivity coating 70 includes three or more infrared-reflective films (e.g., silver-containing films). Low-emissivity coatings having three or more infrared-reflective films are described in U.S. patent application Ser. No. 11/546,152 and U.S. Pat. Nos. 7,572,511 and 7,572,510 and 7,572,509 and Ser. No. 11/545,211 and U.S. Pat. Nos. 7,342,716 and 7,339,728, the teachings of each of which are incorporated herein by reference. In some cases, the low-emissivity coating 70 includes four silver layers. In other cases, the low-emissivity coating 70 is a "single silver" or "double silver" low-emissivity coating, which are well-known to skilled artisans. Advantageous coatings of this nature are commercially available from Cardinal CG Company (Eden Prairie, Minnesota, U.S.A.).

Certain embodiments include a spacer 60 between the two glass sheets 100, 110. The spacer 60 can be adhered to the two glass sheets 100, 110 by one or more beads of sealant 55, as is conventional and well-known to skilled artisans. The spacer 60 may be a conventional metal channel spacer, e.g., formed of stainless steel or aluminum. Or, it can comprise polymer and metal, or just polymer (e.g., foam). The spacer 60 can alternatively be an integral part of a sash, frame, etc. so as to maintain the double-pane insulating glass unit 10 in the desired configuration. In some embodiments, the aerogel layer 200 does not contact the spacer 60. For example, the aerogel layer 200 may be separated (i.e., spaced-apart) from the spacer 60 by about 1 mm to about 5 mm (e.g., about 2-4 mm, or about 3 mm). When provided, the sealant 55 between the spacer 60 and the two glass sheets 100, 110 can also be separated from the aerogel layer 200.

In other cases, the spacer 60 may be omitted in favor of simply providing one or more beads of sealant 58 (optionally together with a moisture vapor barrier carried by, or alongside, the sealant) at the perimeter of the unit so as to surround the between-pane space 50.

In some embodiments where the aerogel layer comprises a plurality of aerogel sheets arranged in tiled configuration, each of the aerogel sheets is spaced from an adjacent one of the aerogel sheets by a gap. Reference is made to FIG. 4. Spacing arrangements of this nature may help ensure that such aerogel sheets will not become damaged. When provided, the gaps preferably are narrow enough to prevent or minimize convection between such aerogel sheets. The gap distance is no greater than 5 mm, and preferably is in a range of from 20 µm to 2 mm (e.g., from 40 µm to 1.5 mm, or from 60 µm to 1.0 mm). In embodiments involving gaps between adjacent aerogel sheets, each gap preferably contains only gas.

Furthermore, in embodiments that involve gaps between adjacent aerogel sheets, the edges of the aerogel sheets can optionally be shaped so as to reduce the sharpness of the contrast and/or transition between the aerogel sheets and the surrounding gap. For example, in some embodiments, each aerogel sheet has a tapered edge configuration, such that each adjacent pair of the aerogel sheets has confronting tapered edges. This, however, is by no means required.

If desired, the perimeter edge of the aerogel layer 200 can have a tapered configuration. When provided, different tapered edge configurations can be used. Reference is made to FIGS. 1 and 2. It is to be appreciated, however, that the aerogel layer 200 is by no means required to have a tapered edge configuration. Reference is made to FIGS. 3 and 4.

The between-pane space 50 has a width W, extending from the interior surface 120 of the first glass pane 100 to the interior surface 130 of the second glass pane 110. The aerogel layer 200 does not occupy the entire width W of the between-pane space 50. To the contrary, as noted above, there is a gas gap G alongside the aerogel layer 200 in the between-pane space 50.

The aerogel layer 200 has a certain thickness. In some embodiments, the aerogel layer 200 has a thickness in a range of from 1.5 mm to 15 mm, such as greater than 2 mm but less than 8 mm, or in a range of from 2 mm to 4 mm (e.g., 3 mm). It is to be appreciated, however, that other thicknesses can be used.

A ratio of the thickness of the aerogel layer 200 to the width of the between-pane space 50 preferably is between 0.15 and 0.85. In some embodiments, the width of the between-pane space 50 is 13 mm or greater, optionally together with the thickness of the aerogel layer 200 being greater than 2 mm but less than 8 mm (such as from 2.5-5.5 mm). In certain embodiments, the aerogel layer 200 occupies less than 50% of the width W of the between-pane space 50 (e.g., less than 45%, less than 40%, or even less than 35% of the width of the between-pane space).

The aerogel layer 200 preferably has an index of refraction of less than 1.1 (such as between 1.0 and 1.1, or more preferably between 1.0 and 1.04). This index of refraction (at 550 nm) can optionally be provided in combination with the aerogel layer 200 having a thickness in a range of from 1.5 mm to 15 mm (such as greater than 2 mm but less than 8 mm, or from 2-4 mm). It is to be appreciated, however, that the index of refraction values noted in this paragraph are optional, and a higher index of refraction may be provided in some cases.

The aerogel layer 200 preferably has a haze of less than 4% (e.g., less than 3%, less than 2%, or even less than 1%). This haze level can optionally be provided in combination with the aerogel layer 200 having an index of refraction of less than 1.1 (and optionally being in either of the closed ranges noted in the preceding paragraph). It is to be appreciated, however, that this haze level is optional. For example, higher haze levels may be suitable depending on the intended application.

Haze can be measured in well-known fashion, e.g., using a BYK Haze-Gard plus instrument. Reference is made to ASTM D 1003-00: Standard Test method for Haze and Luminous Transmittance of Transparent Plastics, the contents of which are incorporated herein by reference.

The aerogel layer 200 preferably has a visible transmittance of greater than 90%. Thus, for any embodiment of the present disclosure, the visible transmittance of the aerogel layer 200 can optionally be greater than 90%. In certain preferred embodiments, the visible transmittance is greater than 92%, greater than 95%, or even up to 97%, for the aerogel layer 200.

The term "visible transmittance" is well known in the art and is used herein in accordance with its well-known meaning to refer to the percentage of all incident visible radiation that is transmitted through an object (e.g., through the aerogel sheet 200). Visible radiation constitutes the wavelength range of between about 380 nm and about 780 nm. Visible transmittance, as well as visible reflectance, can be determined in accordance with NFRC 300-2017, Standard Test Method for Determining the Solar and Infrared Optical Properties of Glazing Materials and Fading Resistance of Systems. The well-known LBNL WINDOW 7.4 computer program can be used in calculating these and other reported optical properties.

The aerogel layer 200 preferably exhibits a transmitted color characterized by "a" and "b" color coordinates that are each between −2 and 2. The present discussion of color properties is reported using the well-known color coordinates of "a" and "b." In more detail, the color coordinates are indicated herein using the subscript h (i.e., $a_h$ and $b_h$) to represent conventional use of the well-known Hunter Lab Color System (Hunter methods/units, Ill. D65, 10 degree observer). The present color properties can be calculated as specified in "Insight on Color," "Hunter L, a, b Color Scale," Applications Note, Vol. 8, No. 9, 06/08 (2008), the relevant teachings of which are incorporated herein by reference.

In addition, the aerogel layer 200 has a low density. In certain embodiments, the aerogel layer 200 has a density of less than 250 kg/m$^3$. In some embodiments, the aerogel layer 200 has a density of less than 235 kg/m$^3$, such as less than 220 kg/m$^3$, or even less than 200 kg/m$^3$.

The aerogel layer 200 also has a low thermal conductivity. In some embodiments, the aerogel layer 200 has a thermal conductivity at atmospheric pressure of less than 0.015 W/(m·K) but greater than or equal to 0.006 W/(m·K). In certain embodiments, the aerogel layer 200 has a thermal conductivity at atmospheric pressure of less than 0.03 W/(m·K) but greater than or equal to 0.006 W/(m·K).

Preferably, the aerogel layer 200 has an R value of between 0.9 and 3.8 ft$^2$·° F.·h/BTU. This can optionally be the case for any embodiment of the present disclosure. The R value of the aerogel layer 200 (in imperial units) can be calculated by dividing the thickness of the aerogel layer 200 (in meters) by the thermal conductivity, and then multiplying that value by 5.7.

As noted above, the aerogel can be a cellulose-based aerogel, e.g., of the nature described in International PCT Patent Application No. PCT/US2019/037122. The cellulose-based aerogel can have all of the properties and features described above. Thus, in any embodiment of the present disclosure, the aerogel can optionally be cellulose-based aerogel.

In one group of preferred embodiments, the low-emissivity coating 70 is on an interior surface 120, 130 of a first one of the two glass panes 100, 110, and the aerogel layer 200 is on an interior surface 120, 130 of a second one of the two glass panes 100, 110. In such embodiments, the low-emissivity coating 70 and the aerogel layer 200 are both located in the between-pane space 50. Reference is made to FIGS. 2 and 3. In the present group of embodiments, the low-emissivity coating 70 and the aerogel layer 200 are separated from each other by a gas gap G, which contains a gaseous atmosphere. Preferably, the double-pane insulating glazing unit 10 in these embodiments has a U factor in a range of from 0.11 to 0.21 Btu/(h·f$^2$·° F.), a visible transmission in a range of 0.64 to 0.76, and a haze of from 0.5% to 4%. In some cases, the U factor is less than 0.2 Btu/(h·f$^2$·° F.) but greater than 0.14 Btu/(h·f$^2$·° F.), and the visible transmission is greater than 0.65 but less than 0.76. In addition, the haze of the double-pane insulating glazing unit 10 can optionally be from 1-2%.

In certain embodiments of the present group, the single between-pane space 50 has a width W in a range of from 13 to 21 mm. In such embodiments, the aerogel layer 200 preferably has a thickness of greater than 2 mm but less than 8 mm, or from 2-4 mm. Furthermore, in some embodiments of this nature, the gaseous atmosphere comprises argon, air, or both, and the gas gap G has a width in a range of from 9 to 14 mm.

The double-pane insulating glass unit 10 in the present embodiment group can optionally further include a transparent conductive oxide coating 80 on an exterior surface of the second one of the two glass panes 100, 110. In such cases, the aerogel layer 200 and the transparent conductive oxide coating 80 are both supported by (e.g., are on opposite surfaces of) the second one of the two glass panes 100, 110. In such embodiments, the U factor preferably is in a range of from 0.11 to 0.19 Btu/(h·f$^2$·° F.). More generally, a transparent conductive oxide coating 80 (e.g., on surface 135) can optionally be provided for any embodiment of the present disclosure.

When provided, the transparent conductive oxide coating 80 may comprise, consist essentially of, or consist of indium tin oxide ("ITO"). In alternate embodiments, zinc aluminum oxide, SnO:Sb, sputtered SnO:F, or another known TCO is used. Thus, in certain embodiments, the transparent conductive oxide coating 80 comprises (e.g., is) a sputtered film that includes tin (e.g., comprising tin oxide together with antimony, fluorine, or another dopant). In some cases, the TCO film (which either forms or is part of the transparent conductive oxide coating 80) includes carbon nanotubes. Preferably, the TCO film (which optionally comprises ITO) is provided at a thickness of 10,000 Å or less, such as between about 1,000 Å and about 7,000 Å, e.g., from 1,000 Å to 1,750 Å, such as about 1,300-1,600 Å. For any embodiment where the transparent conductive oxide coating 80 is provided, it can optionally comprise a TCO (e.g., ITO) film having a thickness of from 1,000 Å to 1,750 Å.

The transparent conductive oxide coating 80 can, for example, be a coating of the type described in any of U.S. Pat. Nos. 9,862,640 or 10,000,965 or 10,000,411 or Ser. No. 16/740,006, the teachings of each of which concerning the transparent conductive oxide coating are hereby incorporated herein by reference.

Thus, in some cases, the double-pane insulating glazing unit 10 includes both a transparent conductive oxide coating 80 and a low-emissivity coating 70. This, however, is not required in all embodiments. For example, in some cases, the double-pane insulating glazing unit 10 includes a low-emissivity coating 70 but is devoid of a transparent conductive oxide coating 80. Reference is made to FIG. 2.

The double-pane insulating glazing unit 10 has pleasing color properties. For example, it preferably has a transmitted color characterized by an an coordinate in a range of from 0 to −6 and a $b_h$ coordinate in a range of from −1 to 5. In some cases, the transmitted color is characterized by an an coordinate in a range of from −1 to −5 and a $b_h$ coordinate in a range of from 0 to 4. In addition, the double-pane insulating glazing unit 10 preferably has an exterior reflected color characterized by an an coordinate in a range of from 2 to −4 and a $b_h$ coordinate in a range of from 1 to −5. In some cases, the exterior reflected color is characterized by an an coordinate in a range of from 1 to −3 and a $b_h$ coordinate in a range of from 0 to −4.

This disclosure also provides methods for producing the double-pane insulating glass unit 10. In such methods, a first glass pane 100 having a surface 120, and a second glass pane 110 having a surface 130, are provided. A plurality of aerogel sheets 210 are produced, optionally in accordance with International PCT Patent Application No. PCT/US2019/037122, the teachings of which are incorporated herein by reference. The resulting aerogel sheets 210 can then be adhered to, for example, the surface 130 of the second glass pane 120 (e.g., through van der Waals forces, or by using an optical adhesive).

In some cases, the aerogel is made in standard size molds and is cut to the size and shape required. In other cases, the aerogel can be made in open-top molds of a desired shape and size. After drying, the aerogel can be adhered to the glass either a) directly from the mold; b) after removing the aerogel from the mold; or c) after transferring the aerogel from the mold to some other container and then to the glass.

The aerogel may be placed manually or, more preferably, with robotics. In some cases, the aerogel is adhered to a temporary surface for handling and placement. The aerogel can be picked-up using electrostatic adhesion, e.g., using commercially available Stackit robots manufactured by Grabit, Inc. (Sunnyvale, California, U.S.A.).

A low-emissivity coating 70 preferably is deposited on surface 120 of the first glass pane 100. Also, prior to applying the aerogel layer 200 to surface 130 of the second glass pane 110, a transparent conductive oxide coating 80 preferably is deposited on surface 135 of the second glass pane 110. These coatings can be deposited using any thin film deposition technique suitable for depositing the desired film materials at the desired thicknesses. In preferred embodiments, both coatings 70, 80 are deposited by sputtering. Sputtering is well known. One preferred sputtering method is DC magnetron sputtering. Reference is made to Chapin's U.S. Pat. No. 4,166,018, the teachings of which are incorporated herein by reference. If desired, one or both coatings 70, 80 can be sputtered by AC or pulsed DC from a pair of cathodes. HiPIMS and other modern sputtering methods may also be used.

The two glass panes 100, 110 can then be assembled together, using any well-known conventional techniques, with a spacer 60 and one or more edge seals 55, 58. In addition, a thermally-insulative gas mix (e.g., 90% argon mixed with 10% air) can be provided to fill the between-pane space 50. Various known conventional IG unit gas-filling techniques can be used.

While some preferred embodiments of the invention have been described, it should be understood that various changes, adaptations and modifications may be made therein without departing from the spirit of the invention and the scope of the appended claims.

Embodiments

1. A double-pane insulating glazing unit, the double-pane insulating glazing unit having a single between-pane space and two glass panes, such that the single between-pane space is located between the two glass panes, and the double-pane insulating glazing unit is devoid of a third glass pane, the double-pane insulating glazing unit having an aerogel layer and a low-emissivity coating, the low-emissivity coating being on an interior surface of a first one of the two glass panes, the aerogel layer being on an interior surface of a second one of the two glass panes, such that the low-emissivity coating and the aerogel layer are both located in the between-pane space, the low-emissivity coating and the aerogel layer being separated from each other by a gas gap, the gas gap containing a gaseous atmosphere, the double-pane insulating glazing unit having a U factor in a range of from 0.11 to 0.21 Btu/(h·f$^2$·° F.), a visible transmission in a range of 0.64 to 0.76, and a haze of from 0.5% to 4%.

2. The double-pane insulating glazing unit of embodiment 1 wherein the U factor is less than 0.2 Btu/(h·f$^2$·° F.) but greater than 0.14 Btu/(h·f$^2$·° F.), and the visible transmission is greater than 0.65 but less than 0.76.

3. The double-pane insulating glazing unit of embodiment 1 or 2 wherein the haze is from 1-2%.

4. The double-pane insulating glazing unit of any of embodiments 1-3 wherein the double-pane insulating glazing unit has a transmitted color characterized by an an coordinate in a range of from 0 to −6 and a $b_h$ coordinate in a range of from −1 to 5.

5. The double-pane insulating glazing unit of embodiment 4 wherein the double-pane insulating glazing unit has a transmitted color characterized by an an coordinate in a range of from −1 to −5 and a $b_h$ coordinate in a range of from 0 to 4.

6. The double-pane insulating glazing unit of any of embodiments 1-5 wherein the double-pane insulating glazing unit has an exterior reflected color characterized by an an coordinate in a range of from 2 to −4 and a $b_h$ coordinate in a range of from 1 to −5.

7. The double-pane insulating glazing unit of embodiment 6 wherein the double-pane insulating glazing unit has an exterior reflected color characterized by an an coordinate in a range of from 1 to −3 and a $b_h$ coordinate in a range of from 0 to −4.

8. The double-pane insulating glazing unit of any of embodiments 1-7 wherein the aerogel layer is devoid of flowable aerogel particles.

9. The double-pane insulating glazing unit of any of embodiments 1-8 wherein the aerogel layer is formed by one or more aerogel sheets adhered to the interior surface of the second one of the two glass panes.

10. The double-pane insulating glazing unit of embodiment 9 wherein each of the one or more aerogel sheets is a self-supporting sheet comprising cellulose-based aerogel.

11. The double-pane insulating glazing unit of any of embodiments 1-10 wherein the single between-pane space has a width in a range of from 13 to 21 mm.

12. The double-pane insulating glazing unit of embodiment 11 wherein the gaseous atmosphere comprises argon, air, or both, and the gas gap has a width in a range of from 9 to 14 mm.

13. The double-pane insulating glazing unit of embodiment 12 wherein the aerogel layer has a thickness of greater than 2 mm but less than 8 mm.

14. The double-pane insulating glazing unit of any of embodiments 1-13 further comprising a transparent conductive oxide coating on an exterior surface of the second one of the two glass panes, such that the aerogel layer and the transparent conductive oxide coating are both supported by the second one of the two glass panes, the U factor being in a range of from 0.11 to 0.19 Btu/(h·f²·° F.).

15. A double-pane insulating glazing unit, the double-pane insulating glazing unit having a single between-pane space and two glass panes, such that the single between-pane space is located between the two glass panes, and the double-pane insulating glazing unit is devoid of a third glass pane, the single between-pane space being located between the two glass panes and having a width of 13 mm or greater, the double-pane insulating glazing unit having an aerogel layer that is carried alongside one of the two glass panes and that is located in the between-pane space, such that a gas gap is provided in the between-pane space alongside the aerogel layer, the gas gap having a width in a range of from 9 to 14 mm and containing a gaseous atmosphere comprising argon, air, or both.

16. The double-pane insulating glazing unit of embodiment 15 wherein the single between-pane space has a width in a range of from 14 to 21 mm, the gaseous atmosphere comprises argon, and the width of the gas gap is from 10.5 to 13.5 mm.

17. The double-pane insulating glazing unit of embodiment 15 or 16 wherein the aerogel layer has a thickness of greater than 2 mm but less than 8 mm.

18. The double-pane insulating glazing unit of any of embodiments 15-17 wherein the aerogel layer is devoid of flowable aerogel particles.

19. The double-pane insulating glazing unit of any of embodiments 15-18 wherein the aerogel layer is formed by one or more aerogel sheets adhered to the interior surface of the second one of the two glass panes.

20. The double-pane insulating glazing unit of embodiment 19 wherein each of the one or more aerogel sheets is a self-supporting sheet comprising cellulose-based aerogel.

21. The double-pane insulating glazing unit of any of embodiments 15-20 having a U factor in a range of from 0.14 to 0.23 Btu/(h·f²·° F.), a visible transmission in a range of 0.64 to 0.76, and a haze of from 0.5% to 4%.

22. The double-pane insulating glazing unit of embodiment 21 wherein the U factor is less than 0.2 Btu/(h·f²·° F.) but greater than 0.14 Btu/(h·f²·° F.), and the visible transmission is greater than 0.65 but less than 0.76.

23. The double-pane insulating glazing unit of embodiment 22 wherein the haze is from 1-2%.

24. The double-pane insulating glazing unit of any of embodiments 15-23 wherein an interior surface of a first one of the two glass panes faces the between-pane space and is a #2 surface and bears a low-emissivity coating, and wherein the aerogel layer is on an interior surface of a second one of the two glass panes, the interior surface of the second one of the two glass panes being a #3 surface, such that the gas gap is located between the low-emissivity coating and the aerogel layer.

25. The double-pane insulating glazing unit of embodiment 24 wherein the first one of the two glass panes is an outboard pane that also has a #1 surface, the double-pane insulating glazing unit being mounted in a frame such that the #1 surface is exposed to an outdoor environment, the second one of the two glass panes being an inboard pane that has a #4 surface exposed to an indoor environment.

26. The double-pane insulating glazing unit of embodiment 24 or 25 wherein the aerogel layer is spaced from the low-emissivity coating by at least 2 mm.

27. The double-pane insulating glazing unit of any of embodiments 15-26 further comprising a transparent conductive oxide coating on an exterior surface of the second one of the two glass panes, such that the aerogel layer and the transparent conductive oxide coating are both supported by the second one of the two glass panes.

28. A double-pane insulating glazing unit, the double-pane insulating glazing unit having a single between-pane space and two glass panes, such that the single between-pane space is located between the two glass panes, and the double-pane insulating glazing unit is devoid of a third glass pane, the double-pane insulating glazing unit having an aerogel layer, a low-emissivity coating, and a transparent conductive oxide coating, the low-emissivity coating being on an interior surface of a first one of the two glass panes, the aerogel layer being on an interior surface of a second one of the two glass panes, such that the low-emissivity coating and the aerogel layer are both located in the between-pane space, the transparent conductive oxide coating being on an exterior surface of the second one of the two glass panes, such that the second one of the two glass panes supports both the aerogel layer and the transparent conductive oxide coating, the low-emissivity coating and the aerogel layer being separated from each other by a gas gap, the gas gap containing a gaseous atmosphere, the double-pane insulating glazing unit having a U factor in a range of from 0.11 to 0.19 Btu/(h·f²·° F.), a visible transmission in a range of 0.64 to 0.72, and a haze of from 0.5% to 4%.

29. The double-pane insulating glazing unit of embodiment 28 wherein the double-pane insulating glazing unit has a transmitted color characterized by an an coordinate in a range of from 0 to −6 and a $b_h$ coordinate in a range of from −1 to 5.

30. The double-pane insulating glazing unit of embodiment 28 or 29 wherein the double-pane insulating glazing unit has an exterior reflected color characterized by an an coordinate in a range of from 2 to −4 and a $b_h$ coordinate in a range of from 1 to −5.

31. The double-pane insulating glazing unit of embodiment 28 wherein the aerogel layer is devoid of flowable aerogel particles.

32. The double-pane insulating glazing unit of any of embodiments 28-31 wherein the aerogel layer is formed by one or more aerogel sheets adhered to the interior surface of the second one of the two glass panes.

33. The double-pane insulating glazing unit of embodiment 32 wherein each of the one or more aerogel sheets is a self-supporting sheet comprising cellulose-based aerogel.

34. The double-pane insulating glazing unit of any of embodiments 28-33 wherein the single between-pane space has a width in a range of from 13 to 21 mm.

35. The double-pane insulating glazing unit of embodiment 34 wherein the gaseous atmosphere comprises argon, air, or both, and the gas gap has a width in a range of from 9 to 14 mm.

36. The double-pane insulating glazing unit of embodiment 35 wherein the aerogel layer has a thickness of greater than 2 mm but less than 8 mm.

What is claimed is:

1. A double-pane insulating glazing unit, the double-pane insulating glazing unit having a single between-pane space and two glass panes, such that the single between-pane space is located between the two glass panes, and the double-pane insulating glazing unit is devoid of a third glass pane and is devoid of a second between-pane space, the double-pane insulating glazing unit further comprising a spacer located between the two glass panes, the spacer being adhered to each of the two glass panes by one or more beads of sealant, the single between-pane space being located between the two glass panes and having a width in a range of from 14 to 21 mm, the double-pane insulating glazing unit having an aerogel layer that is located in the single between-pane space and carried alongside one of the two glass panes such that the aerogel layer is supported by said one of the two glass panes, the double-pane insulating glazing unit having a vision area, the aerogel layer having a perimeter edge that is outside the vision area of the double-pane insulating glazing unit, and the perimeter edge of aerogel layer being separated from the one or more beads of sealant, wherein the aerogel layer occupies less than 50% of the width of the single between-pane space, such that a gas gap is provided in the single between-pane space alongside the aerogel layer, the gas gap having a width in a range of from 10.5 to 13.5 mm and containing a gaseous atmosphere comprising argon or a mixture of argon and air, the aerogel layer having a haze of less than 2%, the double-pane insulating glazing unit having a U factor of less than 0.2 Btu/(h·f$^2$·° F.) but greater than 0.14 Btu/(h·f$^2$·° F.) and a visible transmission of greater than 0.65 but less than 0.76, and the double-pane insulating glazing unit having a transmitted color characterized by an $a_h$ coordinate in a range of from 0 to −6 and a $b_h$ coordinate in a range of from −1 to 5.

2. The double-pane insulating glazing unit of claim 1 wherein the aerogel layer has a thickness of greater than 2 mm but less than 8 mm.

3. The double-pane insulating glazing unit of claim 1 wherein the aerogel layer is devoid of flowable aerogel particles.

4. The double-pane insulating glazing unit of claim 1 wherein the aerogel layer is formed by a single aerogel sheet adhered to the interior surface of the second one of the two glass panes.

5. The double-pane insulating glazing unit of claim 4 wherein the aerogel sheet is a self-supporting sheet.

6. The double-pane insulating glazing unit of claim 1 wherein the width of the gas gap is in a range of from 11 to 13 mm.

7. The double-pane insulating glazing unit of claim 1 wherein the aerogel layer has opposed faces, including one face in contact with an interior surface of said one of the two glass panes, and including another face that is exposed to the single between-pane space.

8. The double-pane insulating glazing unit of claim 1 wherein the transmitted color of the double-pane insulating glazing unit is characterized by the $a_h$ coordinate being in a range of from −1 to −5 and the $b_h$ coordinate being in a range of from 0 to 4.

9. The double-pane insulating glazing unit of claim 1 wherein the double-pane insulating glazing unit has a reflected color characterized by an $a_h$ coordinate in a range of from 2 to −4 and a $b_h$ coordinate in a range of from 1 to −5.

10. The double-pane insulating glazing unit of claim 9 wherein the reflected color of the double-pane insulating glazing unit is characterized by the $a_h$ coordinate being in a range of from 1 to −3 and the $b_h$ coordinate being in a range of from 0 to −4.

11. The double-pane insulating glazing unit of claim 1 wherein the aerogel layer is carried alongside said one of the two glass panes such that the aerogel layer is in direct contact with the glass of said one of the two glass panes.

12. The double-pane insulating glazing unit of claim 1 wherein the aerogel layer does not contact the spacer.

13. The double-pane insulating glazing unit of claim 12 wherein the aerogel layer is separated from the spacer by about 1-5 mm.

14. The double-pane insulating glazing unit of claim 12 wherein the aerogel layer is separated from the spacer by about 2-4 mm.

15. The double-pane insulating glazing unit of claim 1 wherein the haze is less than 1%.

16. The double-pane insulating glazing unit of claim 1 wherein the aerogel layer has a visible transmittance of greater than 95%.

17. The double-pane insulating glazing unit of claim 6 wherein the double-pane insulating glazing unit has a thickness of less than 30 mm.

18. The double-pane insulating glazing unit of claim 17 wherein the thickness of the double-pane insulating glazing unit is less than 23 mm.

19. The double-pane insulating glazing unit of claim 1 wherein the aerogel layer is a single aerogel sheet, such that there is only one aerogel sheet in the single between-pane space.

20. The double-pane insulating glazing unit of claim 1 wherein the aerogel layer has an R value of between 0.9 and 3.8 ft$^2$·° F.·h/BTU.

* * * * *